(12) United States Patent
Kouyama

(10) Patent No.: US 12,189,257 B2
(45) Date of Patent: Jan. 7, 2025

(54) INFORMATION PROCESSING DEVICE AND INFORMATION PROCESSING METHOD

(71) Applicant: SONY GROUP CORPORATION, Tokyo (JP)

(72) Inventor: Yoshiaki Kouyama, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 131 days.

(21) Appl. No.: 17/995,464

(22) PCT Filed: Apr. 5, 2021

(86) PCT No.: PCT/JP2021/014438
§ 371 (c)(1),
(2) Date: Oct. 4, 2022

(87) PCT Pub. No.: WO2021/210436
PCT Pub. Date: Oct. 21, 2021

(65) Prior Publication Data
US 2023/0176437 A1 Jun. 8, 2023

(30) Foreign Application Priority Data
Apr. 15, 2020 (JP) .................. 2020-073047

(51) Int. Cl.
*G02F 1/137* (2006.01)
(52) U.S. Cl.
CPC .......... *G02F 1/137* (2013.01); *G02F 2203/50* (2013.01)

(58) Field of Classification Search
CPC ....................................... G02F 1/137
See application file for complete search history.

(56) References Cited

U.S. PATENT DOCUMENTS

2005/0146655 A1 7/2005 Barge et al.
2012/0148021 A1* 6/2012 Ishii ............ A61B 6/4233
378/62

FOREIGN PATENT DOCUMENTS

| JP | 2005-135479 A | 5/2005 |
|---|---|---|
| JP | 2017-532583 A | 11/2017 |
| WO | 2016/208171 A1 | 12/2016 |

OTHER PUBLICATIONS

International Search Report and Written Opinion of PCT Application No. PCT/JP2021/014438, issued on Jun. 22, 2021, 09 pages of ISRWO.

* cited by examiner

*Primary Examiner* — Lucy P Chien
(74) *Attorney, Agent, or Firm* — CHIP LAW GROUP

(57) ABSTRACT

An information processing device (100) includes an adjustment unit (123) that shifts a phase distribution range of light passing through a phase modulation element with respect to a phase-modulatable range of the phase modulation element in such a way that a difference between a median value of the phase-modulatable range and an average value of the phase distribution range becomes small.

11 Claims, 16 Drawing Sheets

FIG.1
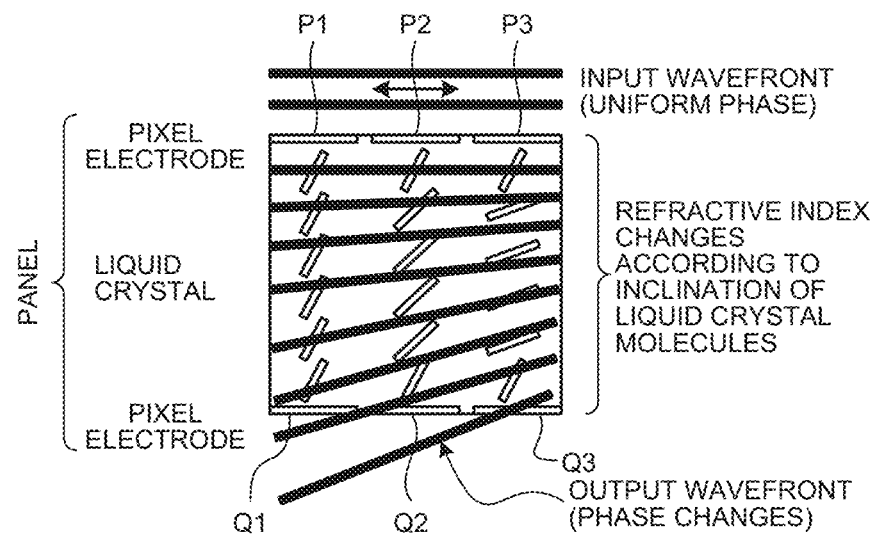
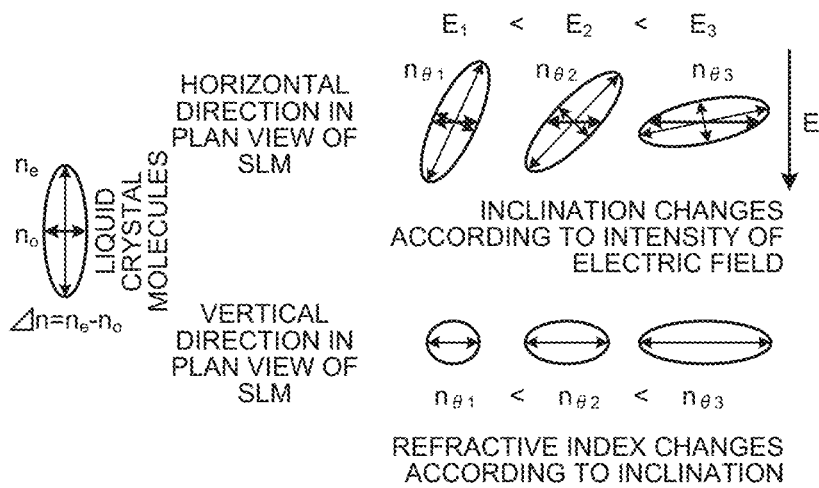

Φ : PHASE AMOUNT
n : LIQUID CRYSTAL REFRACTIVE INDEX (RELATIONSHIP OF V)
d : THICKNESS OF LIQUID CRYSTAL LAYER
λ : WAVELENGTH

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/014438 filed on Apr. 5, 2021, which claims priority benefit of Japanese Patent Application No. JP 2020-073047 filed in the Japan Patent Office on Apr. 15, 2020. Each of the above-referenced applications is hereby incorporated herein by reference in its entirety.

FIELD

The present invention relates to an information processing device, an information processing method, and an information processing program.

BACKGROUND

A spatial light modulator (SLM) is a device that changes (modulates) spatial distribution (an amplitude, a phase, a polarization, or the like) of light from a light source. For example, since a spatial light modulator using a liquid crystal on silicon (LCOS) (registered trademark) technology modulates light with a parallel-aligned nematic liquid crystal layer in a LCOS (registered trademark) chip, it is possible to modulate only the phase of light without accompanying a change in intensity (amplitude) or polarization direction of light. Hereinafter, an element that modulates spatial distribution (hereinafter, also referred to as phase distribution) of the phase of light will be referred to as a phase modulation element.

Conventionally, it is known that an alignment failure called disclination occurs when alignment of liquid crystal molecules between pixels in a phase modulation element is in a direction different from an ideal direction under the influence of a transverse electric field generated between the pixels. In general, in a case where the disclination occurs, the amount of modulation of a phase modulated by the phase modulation element (hereinafter, also referred to as a phase modulation amount) becomes smaller than an intended value, phase modulation accuracy thus decreases.

Therefore, a technology for correcting disclination in a phase modulation element has been proposed. For example, a technology for correcting disclination by changing a display signal level according to the spatial frequency of a pattern of each portion forming a phase modulation pattern created based on a phase address code giving optical phase modulation information has been proposed.

CITATION LIST

Patent Literature

Patent Literature 1: JP 2005-135479 A

SUMMARY

Technical Problem

However, with the above-described conventional technology, it is not always possible to improve the phase modulation accuracy. For example, in the above-described conventional technology, the display signal level is merely changed according to the spatial frequency of the pattern of each portion forming the phase modulation pattern, and the phase modulation accuracy cannot always be improved.

Therefore, the present disclosure proposes an information processing device, an information processing method, and an information processing program capable of improving phase modulation accuracy.

Solution to Problem

To solve the above problem, an information processing device includes an adjustment unit that shifts a phase distribution range of light passing through a phase modulation element with respect to a phase-modulatable range of the phase modulation element in such a way that a difference between a median value of the phase-modulatable range and an average value of the phase distribution range becomes small.

BRIEF DESCRIPTION OF DRAWINGS

FIG. 1 is a diagram for describing an orientation and phase modulation of liquid crystal molecules.

DESCRIPTION OF EMBODIMENTS

Figure 2:
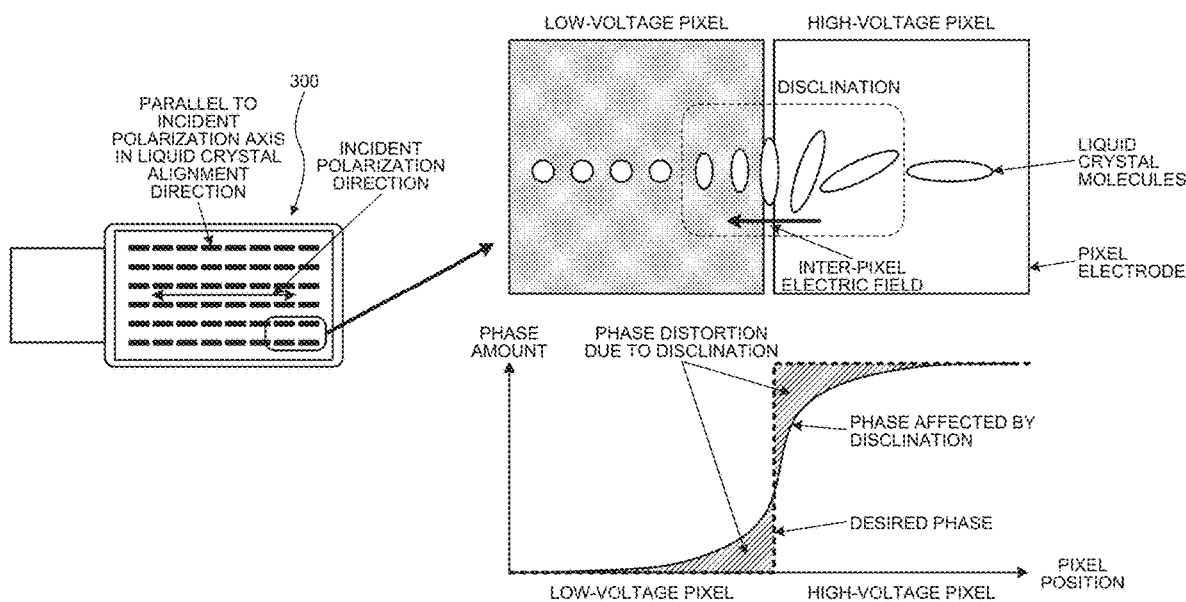
FIG. 2 is a diagram for describing disclination and its influence on a phase modulation amount.

The present disclosure will be described in the following order.
1. Introduction
1-1. Orientation and Phase Modulation of Liquid Crystal Molecules
1-2. Disclination and Its Effect on Phase Modulation Amount
1-3. Example of Disclination Correction
2. First Embodiment
2-1. Outline of Information Processing
2-2. Effects of Information Processing
2-3. Configuration of Information Processing Device
2-4. First Modified Example
2-5. Second Modified Example
3. Second Embodiment
4. Third Embodiment
5. Fourth Embodiment
5. Effects According to Present Disclosure
6. Hardware Configuration

1. Introduction

1-1. Orientation and Phase Modulation of Liquid Crystal Molecules

First, an orientation and phase modulation of liquid crystal molecules will be described with reference to FIG. 1. FIG. 1 is a diagram for describing the orientation and phase modulation of liquid crystal molecules. The upper side of FIG. 1 is a cross-sectional view of a phase modulation element implemented by a liquid crystal panel. The phase modulation element includes a substrate having a common electrode and a substrate having a pixel electrode, and holds a liquid crystal material between the substrates. The example illustrated in the upper part of FIG. 1 illustrates a state in which three pixel elements each including two pixel electrodes and a liquid crystal material (for example, nematic liquid crystal) held between the two pixel electrodes are arranged side by side. Specifically, pixel elements k (k=1, 2, and 3) each including a pixel electrode Pk (k=1, 2, or 3), a pixel electrode Qk (k=1, 2, or 3), and a liquid crystal material held between the pixel electrode Pk and the pixel electrode Qk are arranged in the order of the pixel element 1, the pixel element 2, and the pixel element 3 from the left. Hereinafter, the "pixel element" may be abbreviated as a "pixel". For example, "the position of the pixel element" may be abbreviated as "the position of the pixel".

In general, liquid crystal molecules have strong anisotropy in molecular structure and polarity, and have a property that molecules are aligned in the same direction while having fluidity like a liquid. For example, in the example illustrated in FIG. 1, in a case where no voltage is applied between the pixel electrodes, the liquid crystal molecules are aligned in such a way that the major axis direction of the liquid crystal molecules is a direction perpendicular to a display surface of the liquid crystal panel. In addition, the refractive index of the liquid crystal is different between the major axis direction of the liquid crystal molecules and the minor axis direction orthogonal thereto. Specifically, a refractive index anisotropy $\Delta n$ of the liquid crystal is expressed by "$\Delta n = n_e - n_o$", in which the refractive index of the liquid crystal molecules in the major axis direction is $n_e$ and the refractive index in the minor axis direction is $n_o$.

In addition, as an external field such as an electric field is applied to the liquid crystal molecules, a force (torque) for rotating the liquid crystal molecules is generated, so that it is possible to control the orientation of the liquid crystal molecules. At this time, the orientation of the liquid crystal molecules changes according to the intensity of the external field (for example, an electric field). The refractive index of the liquid crystal changes according to the orientation (inclination) of the liquid crystal molecules. Therefore, the phase modulation element applies a desired voltage between the pixel electrodes to generate an electric field between the pixel electrodes, and controls the orientation of the liquid crystal molecules held between the pixel electrodes, thereby controlling the refractive index of the liquid crystal for each pixel element.

The lower side of FIG. 1 is a diagram illustrating a relationship between the intensity of the electric field generated between the pixel electrodes and the inclination of the liquid crystal molecules. Once a voltage is applied between the pixel electrodes, an electric field E is generated in a direction from the upper pixel electrode toward the lower pixel electrode. Specifically, the intensity of the electric field generated between the pixel elements k illustrated on the upper side of FIG. 1 is denoted by $E_k$ (k=1, 2, or 3), and the angle of the inclination of the liquid crystal molecules held between the pixel elements k is denoted by $\theta_k$ (k=1, 2, or 3). Note that the angle $\theta_k$ of the inclination of the liquid crystal molecules is an angle formed by the major axis of the liquid crystal molecules before the voltage is applied between the pixel electrodes and the major axis of the liquid crystal molecules after the voltage is applied between the pixel electrodes. For example, in a case where a relationship of "$E_1 < E_2 < E_3$" is established between the intensities $E_k$ of the electric field, the angle $\theta_k$ of the inclination of the liquid crystal molecules changes as "$\theta_1 < \theta_2 < \theta_3$" according to the intensity $E_k$ of the electric field. In other words, as the intensity of the electric field increases, the major axis direction of the liquid crystal molecules becomes closer to the horizontal direction (the liquid crystal molecules lie down). In addition, in a case where the refractive index of the liquid crystal held between the pixel elements k is $n_{\theta_k}$ (k=1, 2, 3), the refractive index $n_{\theta_k}$ of the liquid crystal changes as "$n_{\theta_1} < n_{\theta_2} < n_{\theta_3}$" according to the angle $\theta_k$ of the inclination of the liquid crystal molecules.

In view of the above, as illustrated in the upper side of FIG. 1, when light having an input wavefront (the polarization direction of light) parallel to the display surface of the liquid crystal panel is input to the phase modulation element, the light passing through the inside of the phase modulation element is refracted at the refractive index $n_{\theta_k}$ different for each position of the pixel element k. As a result, the shape of an output wavefront of the light output from the phase modulation element changes for each position of the pixel element k. In other words, as compared with the light before passing through the phase modulation element, the light after passing through the phase modulation element is spatially modulated in the shape of the surface with a uniform phase (wavefront). That is, spatial phase distribution (hereinafter, also referred to as phase distribution) of the light after passing through the phase modulation element is modulated as compared with that before passing through the phase modulation element.

1-2. Disclination and its Effect on Phase Modulation Amount

Next, disclination and its influence on a phase modulation amount will be described with reference to FIG. 2. FIG. 2 is a diagram for describing the disclination and its influence on the phase modulation amount. The left side of FIG. 2 is a plan view of a phase modulation element 300 implemented by the liquid crystal panel. That is, the left side of FIG. 2 is a view of the display surface of the liquid crystal panel as viewed from above.

As illustrated on the left side of FIG. 2, the pixel electrodes are two-dimensionally arranged in the plane view of the phase modulation element 300. The liquid crystal alignment direction (the major axis direction of the liquid crystal molecules) before the voltage is applied between the pixel electrodes is a direction perpendicular to the display surface of the liquid crystal panel. At this time, the polarization direction of the light incident on the phase modulation element 300 is parallel to the liquid crystal alignment direction (the direction perpendicular to the display surface of the liquid crystal panel).

A state in which two adjacent pixel elements of the phase modulation element 300 are extracted and enlarged is illustrated on the upper-right side of FIG. 2. In the example illustrated in FIG. 2, in the two pixel elements, the voltage of the right pixel element is higher than the voltage of the left pixel element. Hereinafter, the left pixel element may be referred to as a low-voltage pixel, and the right pixel element may be referred to as a high-voltage pixel. As described above, in a case where a voltage difference is generated between the pixel elements, an electric field (inter-pixel electric field) is also generated between the pixel elements. Therefore, the liquid crystal molecules are not oriented in an intended direction, and a portion where desired phase information cannot be displayed is generated. As described above, a portion where the liquid crystal molecules are not oriented in the intended direction is referred to as the disclination.

The lower-right side of FIG. 2 is a graph illustrating a relationship between the positions (pixel positions) of two adjacent pixel elements and the phase amount of light modulated by the phase modulation element. The dotted line of the graph indicates desired phase distribution. The desired phase distribution is a step-wise graph in which the phase of a range of the low-voltage pixel is zero and the phase of a range of high-voltage pixels is a predetermined value.

On the other hand, the solid line of the graph indicates phase distribution affected by the disclination. As indicated by the solid line of the graph, distortion of the phase distribution due to the disclination occurs near a boundary between the low-voltage pixel and the high-voltage pixel. This is because the phase amount of the light modulated near the boundary of the low-voltage pixel becomes larger than zero due to the disclination, and the phase amount of the light modulated near the boundary of the high-voltage pixel becomes smaller than the predetermined value. As described above, when the disclination occurs, the distortion of the phase distribution occurs near the boundary of the pixels, and the inter-pixel phase difference becomes smaller than an intended phase difference (that is, a desired phase difference).

1-3. Example of Disclination Correction

Figure 3:
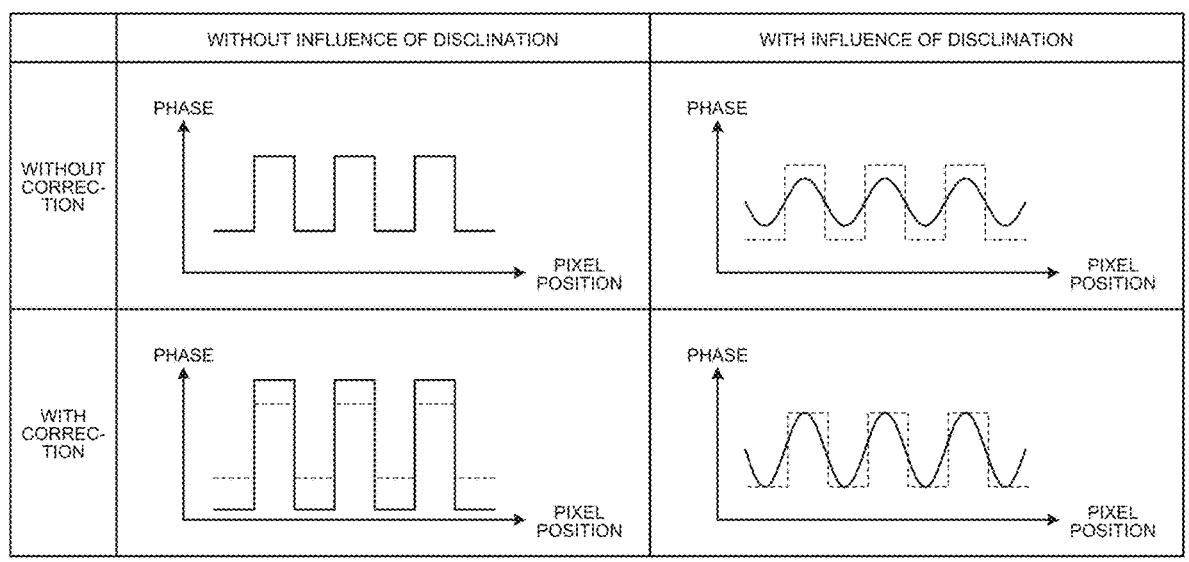
FIG. 3 is a diagram for conceptually describing an example of disclination correction.

Next, an example of disclination correction will be conceptually described with reference to FIG. 3. FIG. 3 is a diagram for conceptually describing an example of the disclination correction. In FIG. 3, as an example of the disclination correction, correction for extending a phase distribution range of light will be described. Here, the phase distribution range indicates a distribution range in a phase axis direction in the phase distribution.

The graph on the upper-left side of FIG. 3 illustrates ideal phase distribution without the influence of the disclination. Here, the ideal phase distribution can be regarded as a rectangular wave in which two different phases are periodically repeated. The phase distribution range corresponds to the amplitude of the rectangular wave.

Further, the dotted line of the graph on the lower-left side of FIG. 3 illustrates ideal phase distribution without the influence of the disclination. The solid line of the graph indicates the phase distribution after the correction for extending the phase distribution range is performed. As illustrated on the lower-left side of FIG. 3, in the phase distribution after the correction, the amplitude of the rectangular wave is larger than that before the correction. As the correction for extending the phase distribution range is performed in this manner, the inter-pixel phase difference increases.

Further, the dotted line of the graph on the upper-right side of FIG. 3 illustrates ideal phase distribution without the influence of the disclination. The solid line of the graph indicates phase distribution affected by the disclination. As indicated by the solid line, when affected by the disclination, the amplitude of the waveform indicating the phase distribution becomes smaller and the inter-pixel phase difference becomes smaller as compared with the ideal phase distribution. That is, when affected by the disclination, the phase distribution range decreases, and the inter-pixel phase difference decreases. As described above, when affected by the disclination, the shape of the phase distribution becomes away from the shape of the ideal phase distribution, and thus, phase modulation accuracy deteriorates.

Further, the dotted line of the graph on the lower-right side of FIG. 3 illustrates ideal phase distribution without the influence of the disclination. The solid line of the graph indicates phase distribution after the correction for extending the phase distribution range is performed on the phase distribution affected by the disclination. More specifically, the solid line of the graph indicates phase distribution after the amplitude decreased due to the influence of the disclination is increased to such an extent as to offset the influence of the disclination. As indicated by the solid line, it can be seen that, by performing the correction for extending the phase distribution range, the inter-pixel phase difference increases as compared with that in a case where the correction is not performed (see the solid line graph on the upper-right side of FIG. 3), and the shape of the phase distribution approaches the ideal phase distribution. As described above, as the correction for extending the phase distribution range decreased due to the influence of the disclination is performed, the shape of the phase distribution that has been deformed due to the influence of the disclination can approach the shape of the ideal phase distribution. As a result, it is possible to improve the phase modulation accuracy as compared with a case where the disclination is not corrected.

2. First Embodiment

2-1. Outline of Information Processing

Figure 4:
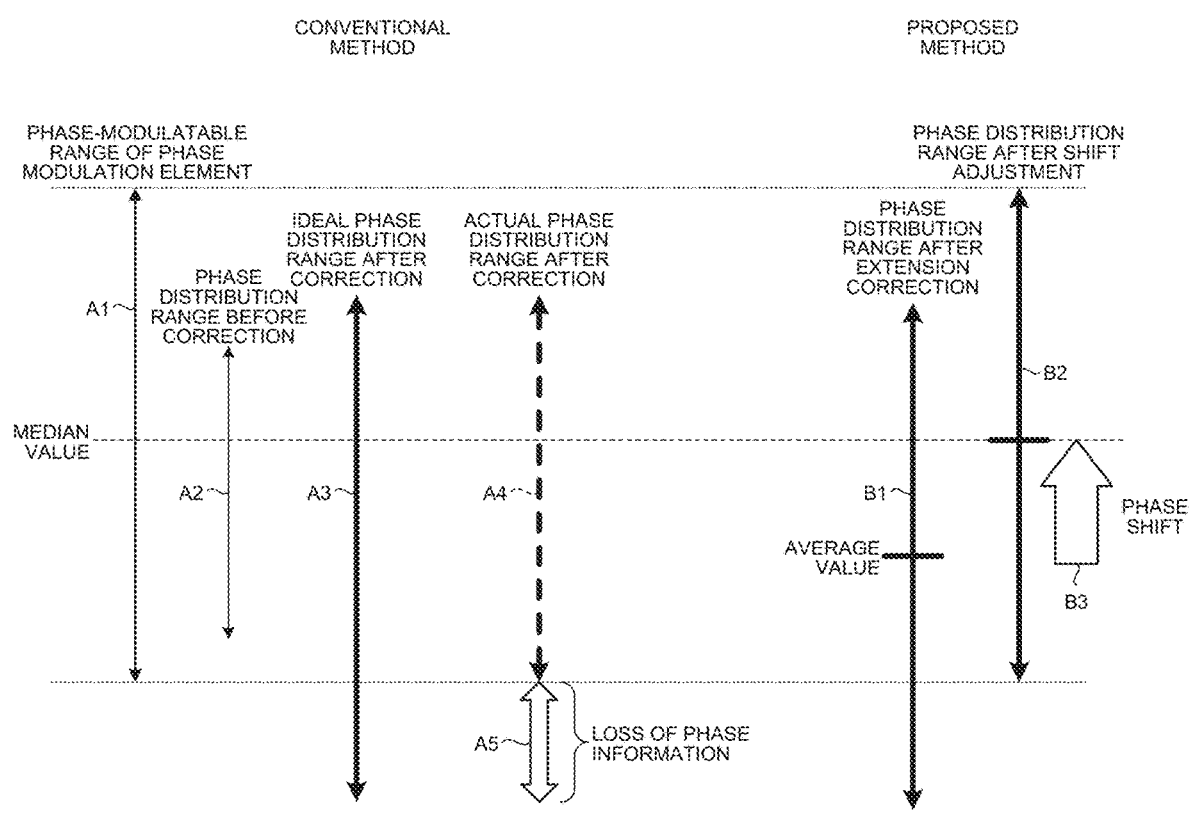
FIG. 4 is a diagram for describing an outline of information processing according to a first embodiment of the present disclosure.

Next, an outline of information processing according to a first embodiment will be described with reference to FIG. 4. FIG. 4 is a diagram for describing the outline of the information processing according to the first embodiment. In FIG. 4, disclination correction processing according to the first embodiment (hereinafter, also referred to as a proposed method) will be described in comparison with disclination correction processing according to the conventional technology (hereinafter, also referred to as a conventional method). The information processing according to the first embodiment illustrated in FIG. 4 is performed by an information processing device 100. The conventional method refers to the correction processing for extending the phase distribution range the phase distribution range as illustrated on the lower-right side of FIG. 3.

The left side of FIG. 4 is a diagram for describing the conventional method. A double-headed arrow A1 illustrated on the left side of FIG. 4 indicates a phase-modulatable range of the phase modulation element. Here, the phase-modulatable range of the phase modulation element indicates a range of the phase of light that can be modulated by the phase modulation element. The phase-modulatable range of the phase modulation element has a value (for example, 0 to $2.4\pi$) unique to the phase modulation element. A double-headed arrow A2 indicates a phase distribution range (for example, 0 to $2\pi$) before correction corresponding to phase distribution generated based on target light intensity distribution (two-dimensional or three-dimensional distribution). Hereinafter, the phase distribution range corresponding to the phase distribution before the correction may be abbreviated as the phase distribution range before the correction. The phase distribution range before the correction is smaller than an ideal phase distribution range (for example, 0 to $2.4\pi$) due to the influence of the disclination. As illustrated in FIG. 4, the phase distribution range before the correction may be unevenly distributed with respect to the median of the phase-modulatable range of the phase modulation element.

A double-headed arrow A3 illustrated on the left side of FIG. 4 indicates a phase distribution range corresponding to ideal phase distribution after the correction. Hereinafter, the phase distribution range corresponding to the phase distribution after the correction may be abbreviated as the phase distribution range after the correction. In the conventional method, the phase distribution range before the correction that has been decreased due to the influence of the disclination is extended to such an extent as to offset the influence of the disclination. According to the conventional method, ideally, the phase distribution range after the correction is as indicated by the double-headed arrow A3. As illustrated in FIG. 4, the phase distribution range after the correction may be unevenly distributed with respect to the median of the phase-modulatable range of the phase modulation element.

In the conventional method, an actual phase distribution range after the correction is as indicated by a double-headed arrow A4. That is, in the conventional method, since the median value of the phase-modulatable range of the phase modulation element does not necessarily coincide with the average value of the phase distribution range after the correction, the phase distribution range after the correction may partially exceed the phase-modulatable range of the phase modulation element. Therefore, in the conventional method, in phase information included in the ideal phase distribution range after the correction indicated by the double-headed arrow A3, phase information of a phase distribution range (indicated by a double-headed arrow A5) exceeding the phase-modulatable range of the phase modulation element may be lost. As described above, in the conventional method, the phase information may be lost, and the phase modulation accuracy may deteriorate.

The right side of FIG. 4 is a diagram for describing the proposed method. In the proposed method, similarly to the conventional method, the information processing device 100 extends the phase distribution range before the correction that has been decreased due to the influence of the disclination to such an extent as to offset the influence of the disclination. A double-headed arrow B1 illustrated on the right side of FIG. 4 indicates a phase distribution range after extension correction.

Subsequently, in the proposed method, the information processing device 100 shifts the phase distribution range after the extension correction with respect to the phase-modulatable range of the phase modulation element in such a way that the median value of the phase-modulatable range of the phase modulation element coincides with the average value of the phase distribution range after the extension correction. A double-headed arrow B2 indicates a phase distribution range after shift adjustment. As described above, in the proposed method, the phase distribution range after the extension correction indicated by the double-headed arrow B1 is shifted by a phase shift indicated by a double-headed arrow B3 with respect to the phase-modulatable range of the phase modulation element indicated by the double-headed arrow A1, thereby obtaining phase distribution corresponding to the phase distribution range after the shift adjustment indicated by the double-headed arrow B2. Here, the magnitude of the phase shift indicated by the double-headed arrow B3 corresponds to a difference between the median of the phase-modulatable range of the phase modulation element indicated by the double-headed arrow A1 and the average value of the phase distribution range after the extension correction indicated by the double-headed arrow B1. As a result, the proposed method can suppress the loss of the phase information indicated by the double-headed arrow A5 unlike the conventional method. As described above, the proposed method can suppress the loss of the phase information unlike the conventional method. Therefore, the information processing device 100 can improve the phase modulation accuracy.

2-2. Effects of Information Processing

Figure 5:
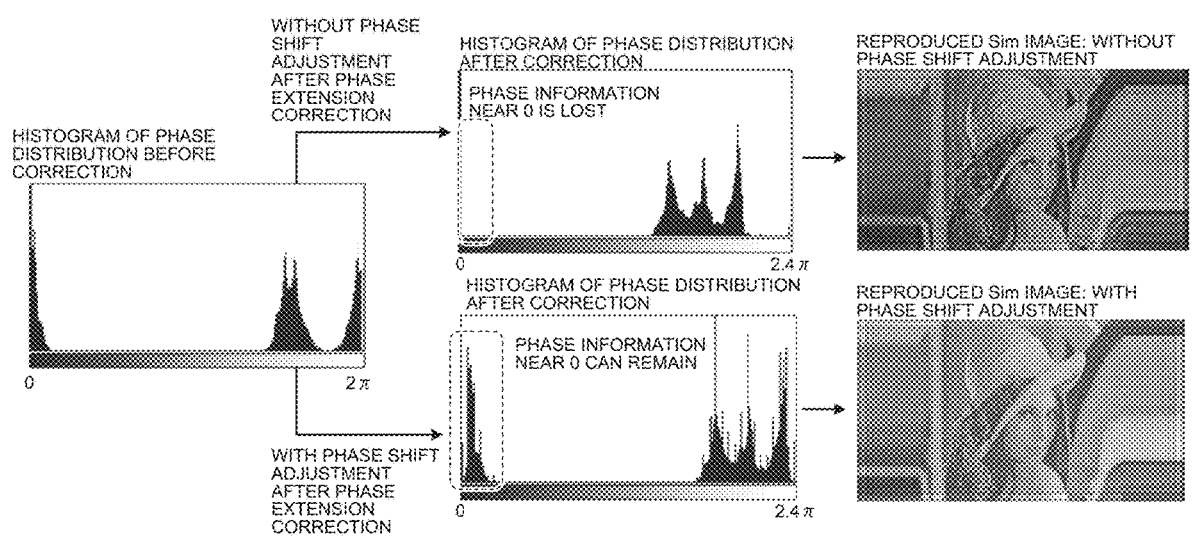
FIG. 5 is a diagram for describing effects of the information processing according to the embodiment.

Next, effects of the information processing according to the first embodiment will be described with reference to FIG. 5. FIG. 5 is a diagram for describing effects of the information processing according to the first embodiment. Continuing from FIG. 4, in FIG. 5, a comparative description of the conventional method and the proposed method will be provided. A histogram of the phase distribution before the correction generated based on the target light intensity distribution is illustrated on the left side of FIG. 5.

The upper-center side of FIG. 5 illustrates a histogram of the phase distribution after the correction according to the conventional method. In the phase distribution after the correction according to the conventional method (corresponding to the double-headed arrow A4 in FIG. 4), it can be seen that the phase information near zero corresponding to the range exceeding the phase-modulatable range of the phase modulation element (the range indicated by the double-headed arrow A5 in FIG. 4) is lost due to the extension correction of the phase distribution range. The upper-right side of FIG. 5 illustrates a reproduced image corresponding to the phase distribution after the correction according to the conventional method. In the conventional method, the phase information is lost due to the correction, and thus, desired phase information cannot be obtained. Therefore, it can be seen that the image quality of the reproduced image according to the conventional method is not so good.

The lower-center side of FIG. 5 illustrates a histogram of the phase distribution after the correction according to the proposed method. In the phase distribution after the correction according to the proposed method (corresponding to the double-headed arrow B2 in FIG. 4), the phase distribution range after the extension correction (corresponding to the double-headed arrow B1 in FIG. 4) is subjected to the shift adjustment (corresponding to the double-headed arrow B3 in FIG. 4), so that it is possible to suppress the loss of the phase information near zero corresponding to the portion exceeding the phase-modulatable range of the phase modulation element (the portion indicated by the double-headed arrow A5 in FIG. 4). The lower-right side of FIG. 5 illustrates a reproduced image corresponding to the phase distribution after the correction according to the proposed method. In the proposed method, the loss of the phase information due to the correction can be suppressed, so that desired phase information can be obtained. Therefore, the image quality of the reproduced image according to the proposed method is improved as compared with the conventional method.

2-3. Configuration of Information Processing Device

Figure 6:
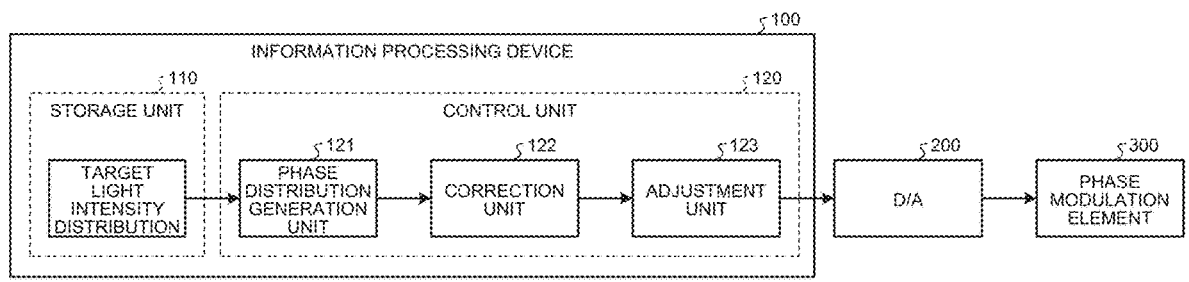
FIG. 6 is a block diagram illustrating a configuration of an information processing device according to the embodiment.

Next, a configuration of the information processing device according to the first embodiment will be described with reference to FIG. 6. FIG. 6 is a block diagram illustrating the configuration of the information processing device according to the first embodiment. As illustrated in FIG. 6, the information processing device 100 includes a storage unit 110 and a control unit 120. Note that the information processing device 100 may include an input unit (for example, a keyboard or a mouse) that receives various operations from an administrator or the like of the information processing device 100.

(Storage Unit 110)

The storage unit 110 is implemented by, for example, a semiconductor memory element such as a random access memory (RAM) or a flash memory, or a storage device such as a hard disk or an optical disk.

(Control Unit 120)

The control unit 120 is a controller, and is implemented by, for example, a central processing unit (CPU) or a micro processing unit (MPU) executing various programs (corresponding to an example of an information processing program) stored in a storage device inside the information processing device 100 using a RAM as a work area. Further, the control unit 120 is a controller and is implemented by, for example, an integrated circuit such as an application specific integrated circuit (ASIC) or a field programmable gate array (FPGA).

As illustrated in FIG. 6, the control unit 120 includes a phase distribution generation unit 121, a correction unit 122, and an adjustment unit 123, and implements or executes actions of the information processing described below. Note that the internal configuration of the control unit 120 is not limited to the configuration illustrated in FIG. 6, and may be another configuration as long as the information processing as described later is performed.

(Phase Distribution Generation Unit 121)

The phase distribution generation unit 121 acquires the target light intensity distribution (two-dimensional or three-dimensional distribution). For example, the phase distribution generation unit 121 acquires light intensity distribution data in which position coordinates of each two-dimensional or three-dimensional position are associated with the amplitude, wavelength, and phase of light at each position. Subsequently, once the light intensity distribution data is acquired, the phase distribution generation unit 121 generates phase distribution based on the acquired light intensity distribution data. For example, the phase distribution generation unit 121 generates phase distribution obtained by mapping the phase modulation amount for each pixel position in the phase modulation element. Subsequently, once the phase distribution is generated, the phase distribution generation unit 121 outputs the generated phase distribution to the correction unit 122.

(Correction Unit 122)

The correction unit 122 extends the phase distribution range. Specifically, the correction unit 122 extends the phase distribution range in such a way that the higher the degree of decrease in phase distribution range due to the influence of the disclination, the higher the degree of extension. More specifically, the correction unit 122 acquires in advance data that enables estimation of the influence of the disclination in the phase modulation element 300. For example, the correction unit 122 acquires data that enables estimation of phase distribution after being affected by the disclination based on the ideal phase distribution in a case where there is no influence of the disclination.

Furthermore, the correction unit 122 acquires the phase distribution (corresponding to the ideal phase distribution in a case where there is no influence of the disclination) generated by the phase distribution generation unit 121 from the phase distribution generation unit 121. Subsequently, the correction unit 122 estimates the phase distribution after being affected by the disclination based on the data that enables estimation of the influence of the disclination in the phase modulation element 300 and the phase distribution acquired from the phase distribution generation unit 121. Then, once the phase distribution after being affected by the disclination is estimated, the correction unit 122 compares the phase distribution acquired from the phase distribution generation unit 121 with the estimated phase distribution, and estimates the degree of decrease in phase distribution range due to the influence of the disclination.

Then, once the degree of decrease in phase distribution range due to the influence of the disclination is estimated, the correction unit 122 increases a difference in voltage applied between the pixel electrodes of the adjacent pixel elements in such a way that the higher the degree of decrease in phase distribution range, the larger the difference is. More specifically, the correction unit 122 generates the difference in voltage between the pixel electrodes of the adjacent pixel elements in such a way as to offset the influence of the disclination. For example, the correction unit 122 acquires in advance data (see FIG. 7 to be described later) indicating a relationship between a voltage applied to the phase modulation element (hereinafter, also referred to as applied voltage) and a phase modulated by the phase modulation element (hereinafter, also referred to as the phase modulation amount).

Then, the correction unit 122 calculates a range of the applied voltage corresponding to the degree of decrease in phase distribution range based on the data indicating the relationship between the applied voltage in the phase modulation element and the phase modulation amount. For example, the correction unit 122 calculates the range of the applied voltage corresponding to the degree of decrease in phase distribution range based on data of a range in which the linearity of a change in phase modulation amount with respect to the applied voltage in the phase modulation element is secured. Once the range of the applied voltage is calculated, the correction unit 122 increases a voltage to be applied between the pixel electrodes of one of two adjacent pixel elements in the phase modulation element by a voltage corresponding to the calculated range of the applied voltage while maintaining a voltage to be applied between the pixel electrodes of the other pixel element constant.

(Adjustment Unit 123)

The adjustment unit 123 shifts the phase distribution range of the light passing through the phase modulation element with respect to the phase-modulatable range of the phase modulation element in such a way that a difference between the median value of the phase-modulatable range and the average value of the phase distribution range becomes small. Specifically, the adjustment unit 123 shifts the phase distribution range with respect to the phase-modulatable range in such a way that the difference between the median value of the phase-modulatable range and the average value of the phase distribution range falls within a predetermined range. For example, the adjustment unit 123 shifts the phase distribution range with respect to the phase-modulatable range in such a way that the median value of the phase-modulatable range coincides with the average value of the phase distribution range. Furthermore, the adjustment unit 123 shifts the phase distribution range with respect to the phase-modulatable range in such a way that an overlapping range between the phase-modulatable range of the phase modulation element and the phase distribution range of the light passing through the phase modulation element becomes large. That is, the adjustment unit 123 shifts the phase distribution range with respect to the phase-modulatable range in such a way that the amount of phase information of the phase distribution included in the phase-modulatable range of the phase modulation element increases.

For example, the adjustment unit 123 applies, to the phase modulation element, a voltage in a range in which the linearity of the change in phase modulation amount with respect to the applied voltage in the phase modulation element is secured. Then, the adjustment unit 123 increases the applied voltage to be applied to the phase modulation element while maintaining the magnitude (hereinafter, also referred to as the phase shift amount) of the difference between the median value of the phase-modulatable range and the average value of the phase distribution range constant. For example, the adjustment unit 123 increases a voltage to be applied between the pixel electrodes of two adjacent pixel elements in the phase modulation element while maintaining the difference in voltage generated between the pixel electrodes of the two pixel elements constant within a range in which the linearity of the change in phase modulation amount with respect to the applied voltage in the phase modulation element is secured. For example, in FIG. 7 described later, a voltage to be applied between the pixel electrodes of two adjacent pixel elements in the phase modulation element is increased in such a way as to shift a low-voltage side region R2 to a high-voltage side region R3 within a predetermined range in which a voltage applied to the phase modulation element is higher than a predetermined threshold VR.

Furthermore, the adjustment unit 123 shifts the phase distribution range extended by the correction unit 122. For example, the adjustment unit 123 shifts the phase distribution range after the extension correction with respect to the phase-modulatable range in such a way that the median value of the phase-modulatable range of the phase modulation element coincides with the average value of the phase distribution range extended by the correction unit 122 (hereinafter, also referred to as the phase distribution range after the extension correction). Subsequently, once the phase distribution range after the extension correction is shifted with respect to the phase-modulatable range, the adjustment unit 123 outputs, to a DA converter 200, phase distribution after shifting the phase distribution range after the extension correction with respect to the phase-modulatable range (hereinafter, also referred to as phase distribution after the shift adjustment).

(DA Converter 200)

The DA converter 200 acquires the phase distribution after the shift adjustment from the adjustment unit 123. The DA converter 200 converts the phase distribution after the shift adjustment acquired from the adjustment unit 123 into a voltage signal based on gamma correction data of the phase modulation element. Once the phase distribution after the shift adjustment is converted into a voltage signal, the DA converter 200 outputs the voltage signal obtained by the conversion to the phase modulation element 300.

(Phase Modulation Element 300)

The phase modulation element 300 acquires the voltage signal corresponding to the phase distribution after the shift adjustment from the DA converter 200. Once the voltage signal is acquired, the phase modulation element 300 applies the acquired voltage signal between the pixel electrodes in the phase modulation element 300.

2-4. First Modified Example

Figure 7:
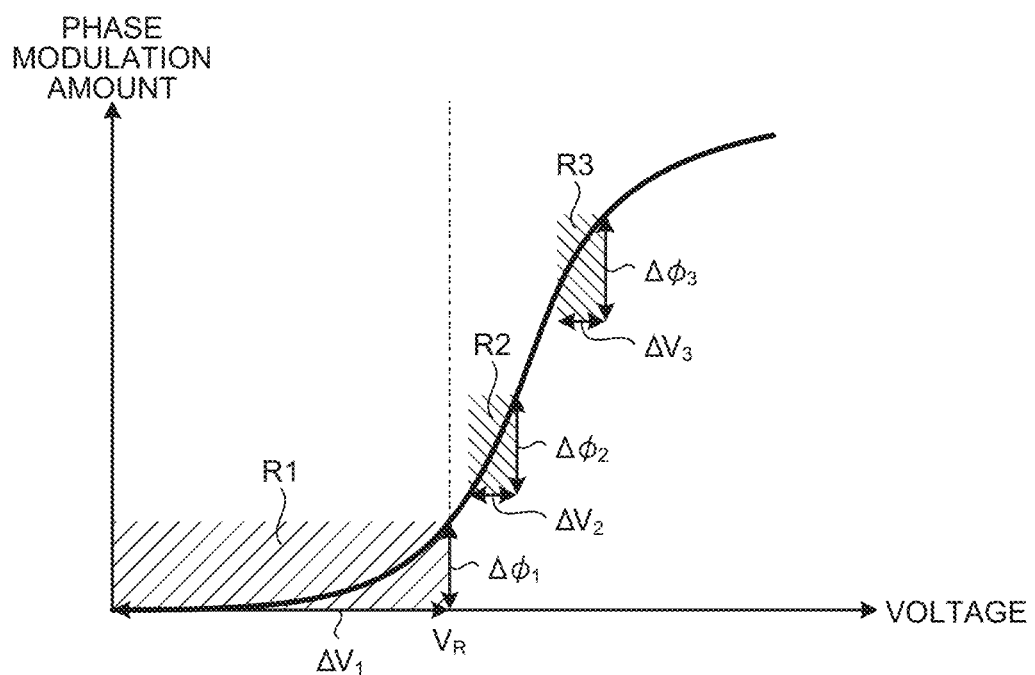
FIG. 7 is a diagram for describing an outline of information processing according to a first modified example of the embodiment.

Next, an outline of information processing according to a first modified example will be described with reference to FIG. 7. FIG. 7 is a diagram for describing the outline of the information processing according to the first modified example. In the first modified example, the information processing device 100 shifts the phase distribution range with respect to the phase-modulatable range within a range in which the linearity of the change in phase modulation amount with respect to the applied voltage in the phase modulation element 300 is secured.

The graph illustrated in FIG. 7 is a graph illustrating a relationship between the applied voltage in the phase modulation element 300 and the phase modulation amount. As illustrated in FIG. 7, in general, the relationship between the applied voltage in the phase modulation element and the phase modulation amount is not linear. Specifically, a region where the applied voltage is in a range from zero to the predetermined threshold VR is a region where the liquid crystal molecules held between the pixel elements start to move due to the influence of the electric field (hereinafter, also referred to as a rising region R1). A change amount $\Delta\phi_1$ of the phase modulation amount with respect to a change amount $\Delta V_1$ of the applied voltage in the rising region R1 is smaller than that in other regions.

A predetermined range in which the applied voltage is higher than the predetermined threshold VR is a region with high linearity. In FIG. 7, two different regions included in the region having high linearity are referred to as a region R2 and a region R3, respectively. In addition, it is assumed that the change amount $\Delta\phi_1$ of the phase modulation amount in the rising region R1 and the change amount $\Delta\phi_2$ (or $\Delta\phi_3$) of the phase modulation amount in the high-linearity region R2 (or R3) are substantially the same.

At this time, as illustrated in FIG. 7, the applied voltage necessary for obtaining substantially the same change amount of the phase modulation amount is greatly different between the rising region R1 and the high-linearity region R2 (or R3). Specifically, the change amount $\Delta V_1$ of the applied voltage in the rising region R1 is considerably larger than the change amount $\Delta V_2$ (or $\Delta V_3$) of the applied voltage in the high-linearity region R2 (or R3). Meanwhile, the applied voltage necessary for obtaining substantially the same change amount of the phase modulation amount is substantially the same in any high-linearity region. Specifically, the change amount $\Delta V_2$ of the applied voltage in the region R2 and the change amount $\Delta V_3$ of the applied voltage in the region R3 are substantially the same.

As described above, the relationship between the voltage and the phase modulation amount is greatly different between the rising region R1 and the high-linearity region R2 (or R3). Therefore, in a case where the shift adjustment from the rising region R1 to the high-linearity region R2 (or R3) is performed after the extension correction of the phase distribution is performed by applying the voltage in the rising region R1, there is a possibility that the accuracy of the phase information after the shift adjustment deteriorates. In addition, also in a case where the shift adjustment is performed in the rising region R1, there is a possibility that the accuracy of the phase information after the shift adjustment similarly deteriorates.

Therefore, in the first modified example, the phase-modulatable range of the phase modulation element 300 is defined by the high-linearity region R2. Specifically, the correction unit 122 applies, to the phase modulation element 300, a voltage in the range in which the linearity of the change in phase modulation amount with respect to the applied voltage in the phase modulation element 300 is secured, thereby defining the phase-modulatable range of the phase modulation element 300 by a high-linearity region. Furthermore, the correction unit 122 applies, to the phase modulation element 300, a voltage in the range in which the linearity of the change in phase modulation amount with respect to the applied voltage in the phase modulation element 300 is secured, thereby extending the phase distribution range.

Furthermore, in the first modified example, the phase distribution range is shifted within the range of the high-linearity region R2. Specifically, the adjustment unit 123 shifts the phase distribution range extended by the correction unit 122 with respect to the phase-modulatable range by applying, to the phase modulation element 300, a voltage in the range in which the linearity of the change in phase modulation amount with respect to the applied voltage in the phase modulation element 300 is secured.

As described above, the adjustment unit 123 shifts the phase distribution range with respect to the phase-modulatable range by applying, to the phase modulation element 300, the voltage in the range in which the magnitude of the change in phase modulation amount with respect to the applied voltage in the phase modulation element 300 exceeds a predetermined threshold (for example, the range in which the linearity of the change in phase modulation amount with respect to the applied voltage is secured). As a result, the information processing device 100 can keep the accuracy of the phase information after the shift adjustment high. Therefore, the information processing device 100 can further improve the phase modulation accuracy.

2-5. Second Modified Example

In addition, the correction unit 122 may calculate an amount corresponding to the degree of decrease in amplitude due to the influence of the disclination by using a display grayscale of the display or a signal voltage corresponding to the phase amount instead of using the phase amount. Then, the correction unit 122 extends the phase distribution range based on the value calculated using the display grayscale of the display or the signal voltage. The shift adjustment in the adjustment unit 123 can be performed by performing replacement with a numerical value obtained by converting the phase modulation range of the phase modulation element into the display grayscale of the display or the signal voltage. Note that, in a case of using the signal voltage, the DA conversion is performed by the DA converter 200 before the extension correction performed by the correction unit 122 illustrated in FIG. 6. The DA conversion is not performed by the DA converter 200 on the upstream of the phase modulation element 300 illustrated in FIG. 6.

3. Second Embodiment

Figure 8:
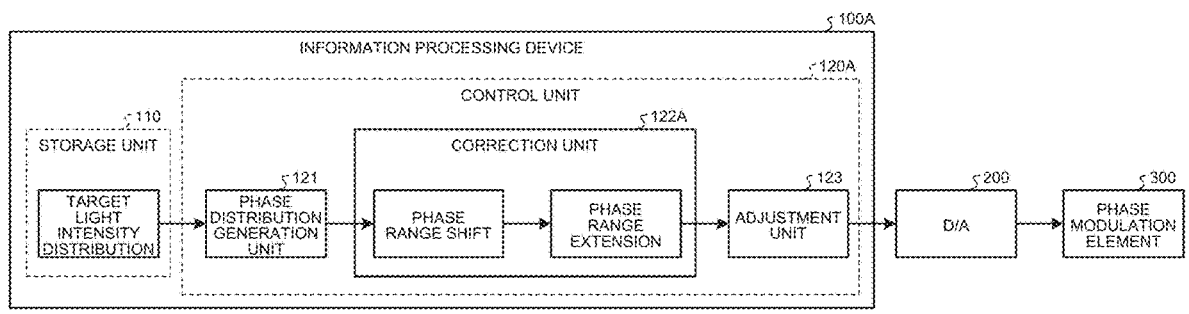
FIG. 8 is a diagram illustrating an example of a configuration of an information processing device according to a second embodiment of the present disclosure.

Next, an example of a configuration of an information processing device according to a second embodiment will be described with reference to FIG. 8. FIG. 8 is a diagram illustrating an example of the configuration of the information processing device according to the second embodiment. In general, the influence of the disclination increases as the spatial frequency of the phase distribution increases. In other words, the influence of the disclination increases as the apparent inter-pixel phase difference increases. Therefore, in the second embodiment, before extending the phase distribution range, an information processing device 100A shifts the phase distribution within one phase cycle in such a way as to decrease the spatial frequency of the phase distribution of the light passing through the phase modulation element.

The information processing device 100A according to the second embodiment includes a control unit 120A instead of the control unit 120 included in the information processing device 100 described in the first embodiment, and a correction unit 122A instead of the correction unit 122. Therefore, a description of each processing unit described with reference to FIG. 6 is omitted.

(Control Unit 120A)

The control unit 120A is a controller, and is implemented by, for example, a CPU or a MPU executing various programs (corresponding to an example of an information processing program) stored in a storage device inside the information processing device 100A using a RAM as a work area. Furthermore, the control unit 120A is a controller, and is implemented by, for example, an integrated circuit such as an ASIC or an FPGA.

As illustrated in FIG. 8, the control unit 120A includes a phase distribution generation unit 121, a correction unit 122A, and an adjustment unit 123, and implements or executes actions of the information processing described below. Note that the internal configuration of the control unit 120A is not limited to the configuration illustrated in FIG. 8, and may be another configuration as long as the information processing as described later is performed.

(Correction Unit 122A)

As illustrated in FIG. 8, the correction unit 122A shifts phase distribution within one phase cycle in such a way as to decrease the spatial frequency of the phase distribution of light passing through the phase modulation element (phase range shifting processing). Subsequently, once the phase distribution is shifted within one phase cycle, the correction unit 122A extends the shifted phase distribution range (phase range extension processing). Thereafter, the adjustment unit 123 shifts the phase distribution range extended by the correction unit 122A with respect to the phase-modulatable range.

Figure 9:
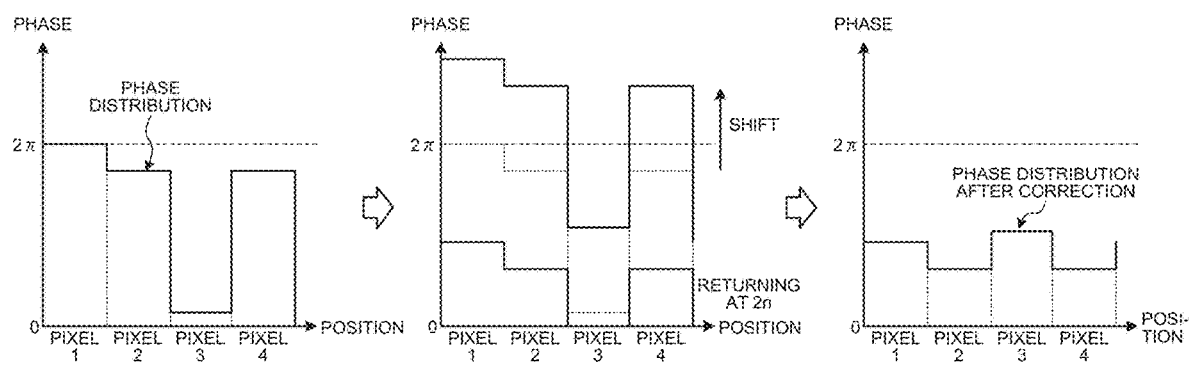
FIG. 9 is a diagram for describing an outline of information processing according to the embodiment.

Next, an outline of information processing according to the second embodiment will be described with reference to FIG. 9. FIG. 9 is a diagram for describing the outline of the information processing according to the second embodiment. Specifically, FIG. 9 is a diagram for describing the phase range shifting processing performed by the correction unit 122A. The left side of FIG. 9 illustrates the phase distribution generated by the phase distribution generation unit 121 (hereinafter, also referred to as the phase distribution before the correction). The phase distribution generated by the phase distribution generation unit 121 is within in a range of $2\pi$ or less.

Here, as long as the inter-pixel phase difference is maintained, the phase information of the phase distribution does not change before and after the shifting even if the entire phase distribution is shifted by the same phase amount within one cycle. Therefore, as illustrated in the center of FIG. 9, the correction unit 122A shifts in parallel the phase distribution by the same phase amount within one phase cycle. The right side of FIG. 9 illustrates the phase distribution after the correction after the parallel-shifting performed by the correction unit 122A. It can be seen that the apparent phase difference between a pixel 2 and a pixel 3 and the apparent phase difference between the pixel 3 and a pixel 4 are small in the phase distribution after the correction, unlike the phase distribution before the correction illustrated on the left side of FIG. 9. That is, the apparent inter-pixel phase difference in the phase distribution after the correction is smaller than in the phase distribution before the correction. As described above, the correction unit 122A shifts the phase distribution range within one phase cycle in such a way that the apparent inter-pixel phase difference in the phase distribution decreases.

Here, when spatial frequency distribution of the phase distribution before the correction and spatial frequency distribution of the phase distribution after the correction are obtained using the Fourier transform, the phase distribution after the correction contains more low-frequency components than the phase distribution before the correction. On the contrary, the phase distribution before the correction contains more high-frequency components than the phase distribution after the correction. That is, the spatial frequency of the phase distribution after the correction is lower than that of the phase distribution before the correction. As described above, before extending the phase distribution range, the correction unit 122A shifts the phase distribution range within one phase cycle in such a way as to decrease the spatial frequency of the phase distribution.

In addition, the apparent phase difference between adjacent pixels is smaller and the waveform is gentler in the phase distribution after the correction than in the phase distribution before correction. That is, it can be seen that the waveform indicating the phase distribution after the correction has a smaller spatial change than the phase distribution before the correction. As described above, the correction unit 122A shifts the phase distribution range within one phase cycle in such a way that the spatial change of the waveform indicating the phase distribution becomes small.

In addition, in a case of the phase distribution after the correction, the phase distribution near zero and the phase distribution near $2\pi$ are suppressed as compared with the phase distribution before the correction, and it can be seen that the phase distribution is positioned at the center as a whole. Here, in a case where the phase distribution near zero and the phase distribution near $2\pi$ are large, the apparent inter-pixel phase difference increases, and thus the influence of the disclination increases. Therefore, in the second embodiment, by performing adjustment to shift the phase distribution range in such a way as to suppress the phase distribution components near zero and $2\pi$, it is possible to decrease the apparent inter-pixel phase difference and suppress the influence of the disclination. As a result, the information processing device 100A can enhance the effect of the extension correction. Therefore, the information processing device 100A can further improve the phase modulation accuracy.

Figure 10:
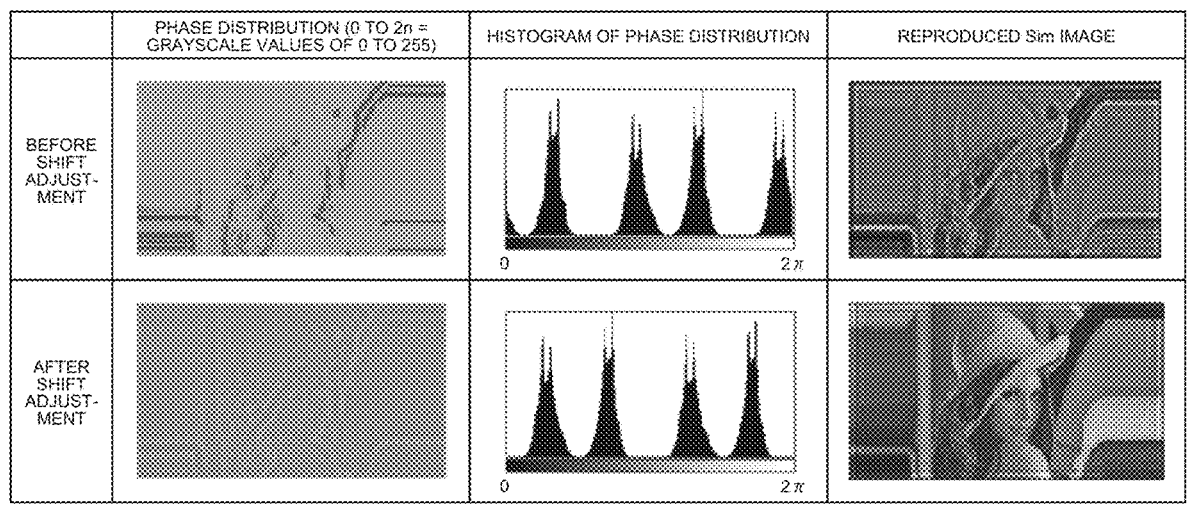
FIG. 10 is a diagram for describing effects of the information processing according to the embodiment.

Next, effects of information processing according to the second embodiment will be described with reference to FIG. 10. FIG. 10 is a diagram for describing the effects of the information processing according to the second embodiment. The left side of the upper part of FIG. 10 illustrates the phase distribution before phase distribution range shift correction. The left side of the lower part of FIG. 10 illustrates the phase distribution after the phase distribution range shift correction. In the phase distribution after the phase distribution range shift correction, the apparent inter-pixel phase difference in the phase distribution is smaller as compared with the phase distribution before the phase distribution range shift correction, and thus the grayscale value of the phase distribution is low.

The center of the upper part of FIG. 10 illustrates a histogram of the phase distribution before the phase distribution range shift correction. The center of the lower part of FIG. 10 illustrates a histogram of the phase distribution after the phase distribution range shift correction. As compared with a histogram of the phase distribution before the phase distribution range shift correction, in the histogram of the phase distribution after the phase distribution range shift correction, it can be seen that the phase distribution components near zero and $2\pi$ are suppressed, and the phase distribution is positioned closer to the center as a whole.

The right side of the upper part of FIG. 10 illustrates a reproduced image based on the phase distribution before the phase distribution range shift correction. Furthermore, the right side of the lower part of FIG. 10 illustrates a reproduced image based on the phase distribution after the phase distribution range shift correction. It can be seen that the image quality of the reproduced image after the phase distribution range shift correction is improved as compared with the image quality of the reproduced image before the phase distribution range shift correction.

Figure 11:
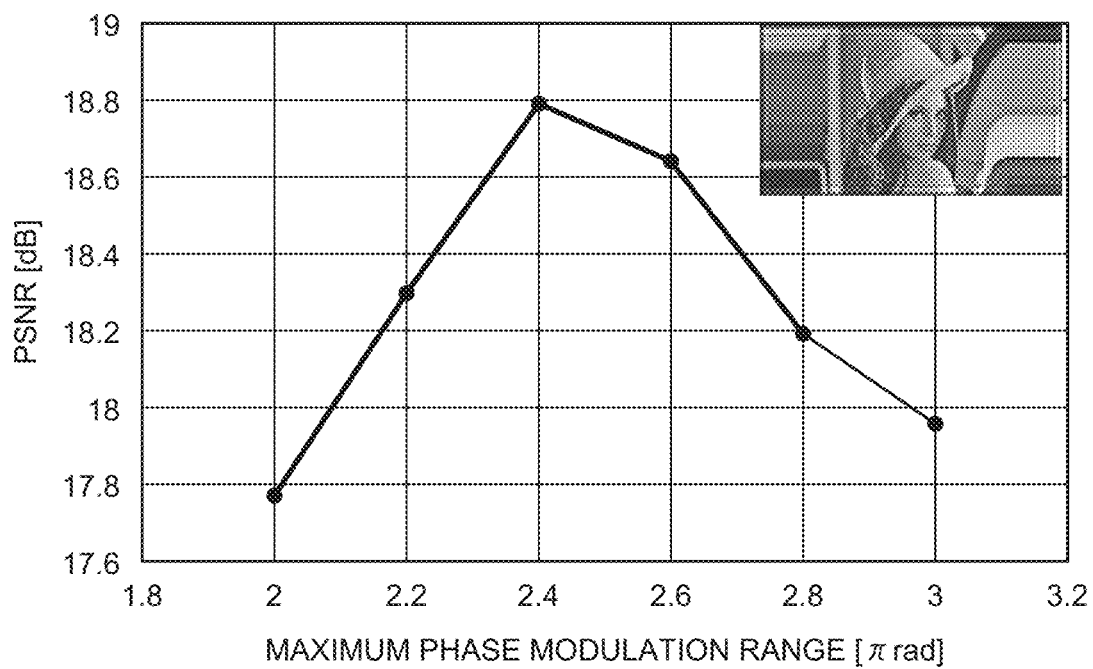
FIG. 11 is a diagram for describing an image quality improvement effect in a case where a phase-modulatable range of a phase modulation element is uniformly extended.

Next, an image quality improvement effect in a case where the phase-modulatable range of the phase modulation element is uniformly extended will be described with reference to FIG. 11. FIG. 11 is a diagram for describing an image quality improvement effect in a case where the phase-modulatable range of the phase modulation element is uniformly extended.

As a method of extending the phase-modulatable range by the correction unit 122, the phase-modulatable range may be uniformly extended, or the phase-modulatable range may be determined according to the magnitude of the spatial change of the waveform indicating the phase distribution. Specifically, in the method of uniformly extending the phase-modulatable range, it is sufficient if the phase amount is increased at a constant ratio regardless of the magnitude of the spatial change of the waveform indicating the phase distribution. In this case, optimization can be made by changing the increase ratio according to the degree of influence of the disclination.

FIG. 11 illustrates a result of calculating a peak signal-to-noise ratio (PSNR) by simulation when the phase-modulatable range is uniformly extended from $2\pi$ to $3\pi$. As can be seen from the calculation result illustrated in FIG. 11, the PSNR has the maximum value in a case where the phase-modulatable range is extended to $2.4\pi$, and the image quality is improved as compared with a case where the phase-modulatable range is $2\pi$.

4. Third Embodiment

Figure 12:
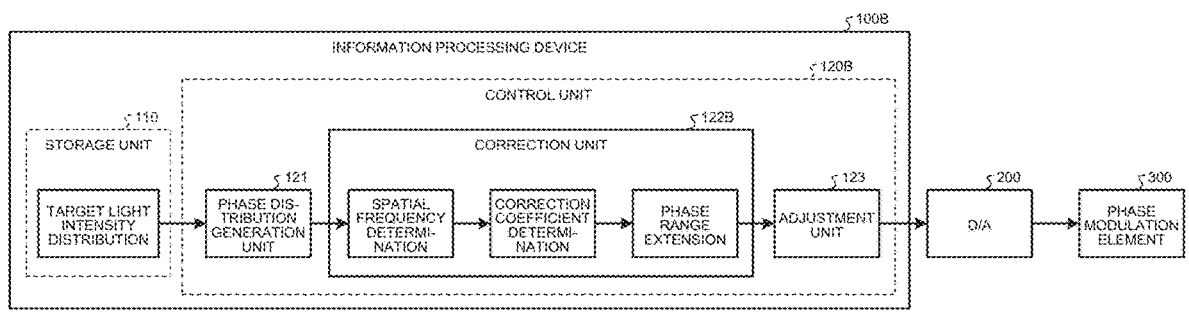
FIG. 12 is a diagram illustrating an example of a configuration of an information processing device according to a third embodiment of the present disclosure.

Next, an example of a configuration of an information processing device according to a third embodiment will be described with reference to FIG. 12. FIG. 12 is a diagram illustrating an example of the configuration of the information processing device according to the third embodiment. As described above, in general, the influence of the disclination increases as the spatial frequency of the phase distribution increases. Therefore, in the third embodiment, an information processing device 100B determines a correction amount according to the spatial frequency of the phase distribution. Specifically, the information processing device 100B increases an extension amount of the phase distribution range as the spatial frequency of the phase distribution increases.

The information processing device 100B according to the third embodiment includes a control unit 120B instead of the control unit 120 included in the information processing device 100 described in the first embodiment, and a correction unit 122B instead of the correction unit 122. Therefore, a description of each processing unit described with reference to FIG. 6 is omitted.

(Control Unit 120B)

The control unit 120B is a controller, and is implemented by, for example, a CPU or a MPU executing various programs (corresponding to an example of an information processing program) stored in a storage device inside the information processing device 100B using a RAM as a work area. Furthermore, the control unit 120B is a controller, and is implemented by, for example, an integrated circuit such as an ASIC or an FPGA.

As illustrated in FIG. 12, the control unit 120B includes a phase distribution generation unit 121, a correction unit 122B, and an adjustment unit 123, and implements or executes actions of the information processing described below. Note that the internal configuration of the control unit 120B is not limited to the configuration illustrated in FIG. 12, and may be another configuration as long as the information processing as described later is performed.

(Correction Unit 122B)

As illustrated in FIG. 12, the correction unit 122B obtains the spatial frequency distribution of the phase distribution generated by the phase distribution generation unit 121 by using the Fourier transform (spatial frequency determination processing). Then, the correction unit 122B performs correction in such a way as to increase the increase amount of the phase modulation amount as the spatial frequency increases. For example, once the spatial frequency distribution of the phase distribution is obtained, the correction unit 122B implements the correction by a method of performing the correction in such a way that the phase amount of the high-frequency component increases in the frequency space or a method of convolving an edge enhancement filter with the phase distribution (correction coefficient determination processing). Subsequently, once a correction coefficient for increasing the increase amount of the phase modulation amount as the spatial frequency increases is determined, the correction unit 122B extends the phase distribution range by applying the determined correction coefficient (phase range extension processing). Thereafter, the adjustment unit 123 shifts the phase distribution range extended by the correction unit 122B with respect to the phase-modulatable range.

In general, the degree of influence of the disclination varies depending on the alignment direction of the liquid crystal molecules. Therefore, the correction unit 122B may perform the correction in such a way that the increase amount of the phase modulation amount becomes large with respect to pixels adjacent to each other in a direction parallel to the alignment direction in which the degree of influence of the disclination is high. For example, a method of expressing the influence of the disclination by convolving a Gaussian function with the ideal phase distribution is known. However, as shown in the following Formula (1), alignment direction dependency can be considered by introducing $x_{shift}$ and $y_{shift}$, which are axial shifts, to the Gaussian function. Here, $\Phi_{discli}$ represents the phase distribution after being affected by the disclination, $\Phi_{ideal}$ represents the ideal phase distribution, $r_x$ and $r_y$ represent variances in the x direction and the y direction, respectively, $x_{shift}$ and $y_{shift}$ represent average values in the x axis direction and the y axis direction, respectively, and $\gamma$ represents a shape parameter.

$$\phi_{discli}(x, y) = \phi_{ideal}(x, y) \otimes \exp\left[-\left(\frac{(x-x_{shift})^2}{2r_x^2} + \frac{(y-y_{shift})^2}{2r_y^2}\right)^\gamma\right] \quad (1)$$

For example, the correction unit 122B calculates the phase distribution after being affected by the disclination by using Formula (1). Then, the correction unit 122B performs deconvolution calculation as shown in the following Formula (2) in order to generate phase distribution in which the phase modulation amount is increased using Formula (1). Here, $\Phi_{deconv}$ represents the phase distribution after the correction, $a(x,y)$ represents the Gaussian function portion of Formula (1), and $\varepsilon$ represents a noise component. In addition, $(F^*[a(x,y)])/(|F[a(x,y)]|^\wedge 2+\varepsilon)$ is called a Wiener filter.

$$\phi_{deconv}(x, y) \approx \mathcal{F}^{-1}\left[\frac{\mathcal{F}^*[a(x, y)]}{|\mathcal{F}[a(x, y)]|^2 + \epsilon}\mathcal{F}[\phi_{ideal}(x, y)]\right] \quad (2)$$

Furthermore, in a case of using convolution calculation of the edge enhancement filter, the correction unit 122B uses a matrix of n×m (n and m are odd numbers, and at least one of n and m is 3 or more) as the filter. At this time, the correction unit 122B may modify Formula (2) into the following Formula (3) and determine each coefficient in the filter based on $F^\wedge (-1)[(F^{\wedge*}[a(x,y)])/(|F[a(x,y)]|^\wedge 2+\varepsilon)]$ by using the Wiener filter.

$$\phi_{deconv}(x, y) \approx \mathcal{F}^{-1}\left[\frac{\mathcal{F}^*[a(x, y)]}{|\mathcal{F}[a(x, y)]|^2 + \epsilon}\right] \otimes \phi_{ideal}(x, y) \quad (3)$$

Furthermore, the correction unit 122B may change, for each frame, the correction coefficient for the correction calculation. In addition, in a case where the phase information is often lost even after the phase shift adjustment by the adjustment unit 123 due to an increase in increase amount of the modulation amount, the correction unit 122B can change a correction value in such a way as to decrease the increase amount. It is desirable that the correction unit 122B change the correction coefficient according to a power spectrum intensity in a high spatial frequency component of the phase distribution. Here, the correction coefficient corresponds to the Wiener filter or the edge enhancement filter.

5. Fourth Embodiment

Figure 13:
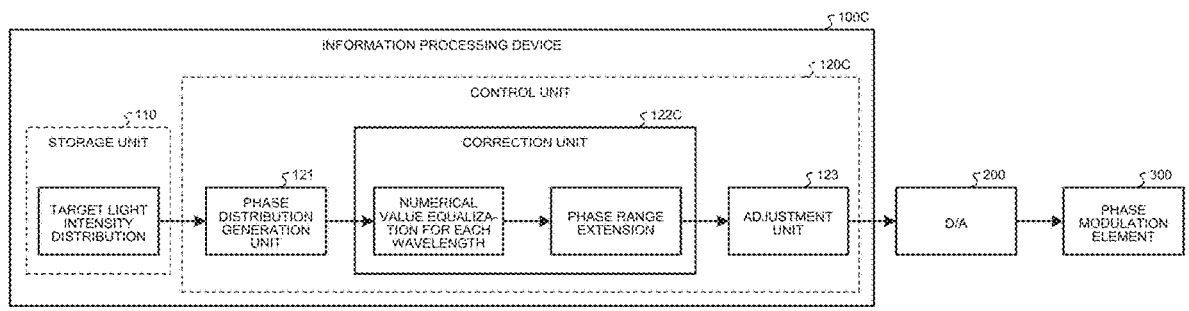
FIG. 13 is a diagram illustrating an example of a configuration of an information processing device according to a fourth embodiment of the present disclosure.

Next, an example of a configuration of an information processing device according to a fourth embodiment will be described with reference to FIG. 13. FIG. 13 is a diagram illustrating an example of the configuration of the information processing device according to the fourth embodiment. In a case where target intensity distribution includes a mixture of a plurality of wavelengths, the correction in which a correction coefficient different for each wavelength is applied and the correction in which the same correction coefficient is used regardless of the wavelength can be performed. Therefore, the target intensity distribution can be colorized.

Figure 14:
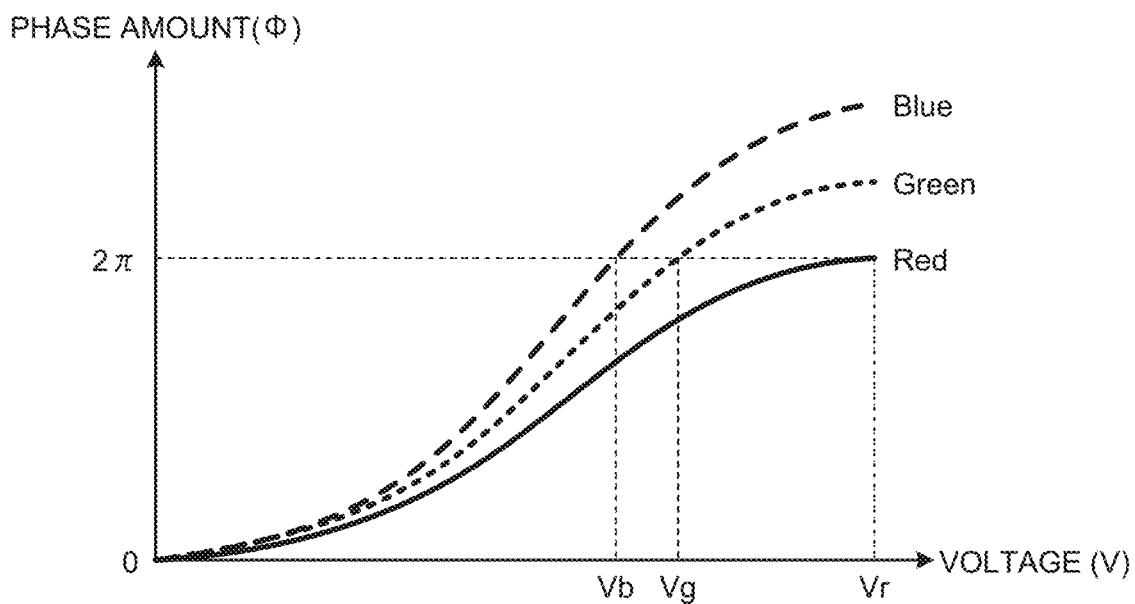
FIG. 14 is a diagram for describing a relationship between a voltage and the phase modulation amount for each wavelength.
Figure 15:
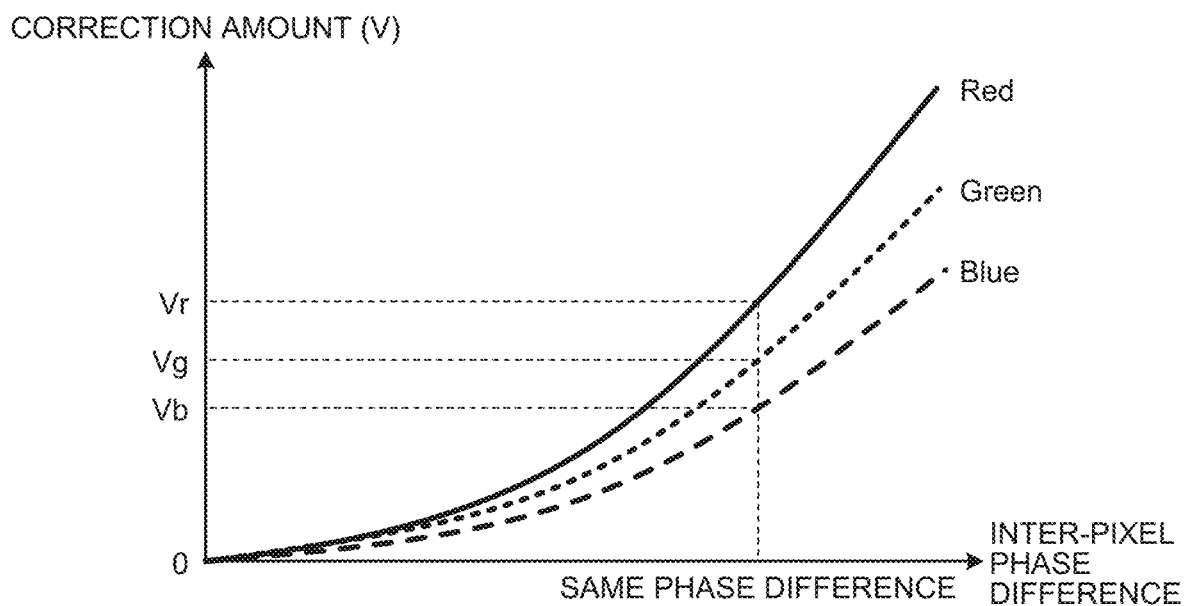
FIG. 15 is a diagram for describing a relationship between an inter-pixel phase difference and a correction amount for each wavelength.

Prior to the description of FIG. 13, a case where a correction coefficient different for each wavelength is applied will be described with reference to FIGS. 14 and 15. First, a relationship between the voltage and the phase modulation amount for each wavelength will be described with reference to FIG. 14. FIG. 14 is a diagram for describing the relationship between the voltage and the phase modulation amount for each wavelength. FIG. 14 illustrates a relationship between a voltage and a phase modulation amount for each of three wavelengths of blue light, green light, and red light. As can be seen from FIG. 14, the longer the wavelength, the higher the applied voltage is required to obtain the same phase modulation amount at different wavelengths.

Next, a relationship between the inter-pixel phase difference and the correction amount (the applied voltage for obtaining the desired phase difference) for each wavelength will be described with reference to FIG. 15. FIG. 15 is a diagram for describing the relationship between the inter-pixel phase difference and the correction amount for each wavelength. FIG. 15 illustrates a relationship between an inter-pixel phase difference and a correction amount of each of three wavelengths of blue light, green light, and red light. As can be seen from FIG. 15, it is necessary to increase the correction amount as the inter-pixel phase difference increases, but the correction amount required to obtain the same inter-pixel phase difference differs for each wavelength. Specifically, it can be seen that the longer the wavelength, the larger the correction amount is required to obtain the same inter-pixel phase difference.

As described above, in a case of performing the correction in which a correction coefficient different for each wavelength is applied, it is sufficient if light of different wavelengths is sequentially radiated to the phase modulation element instead of collectively radiating light of a plurality of wavelengths at a time. For example, blue light, green light, and red light are incident on the phase modulation element at separate timings, respectively, in the order of blue, green, and red. At this time, a correction coefficient suitable for the blue light is applied to the phase modulation element at the timing at which the blue light is incident. Then, switching to a correction coefficient suitable for the red light is made, and the correction coefficient suitable for the red light is applied to the phase modulation element at the timing at which the red light is incident. Further, switching to a correction coefficient suitable for the green light is made, and the correction coefficient suitable for the green light is applied to the phase modulation element at the timing at which the green light is incident.

As described above, it is also possible to perform the correction in which a correction coefficient different for each wavelength is applied, but it is necessary to prepare the correction coefficient for each wavelength, and thus it takes a little time and effort. Therefore, in the fourth embodiment, an information processing device 100C performs the correction using the same correction coefficient regardless of the wavelength.

Return to the description of FIG. 13. The information processing device 100C according to the fourth embodiment includes a control unit 120C instead of the control unit 120 included in the information processing device 100 described in the first embodiment, and a correction unit 122C instead of the correction unit 122. Therefore, a description of each processing unit described with reference to FIG. 6 is omitted.

(Control Unit 120C)

The control unit 120C is a controller, and is implemented by, for example, a CPU or a MPU executing various programs (corresponding to an example of an information processing program) stored in a storage device inside the information processing device 100C using a RAM as a work area. Furthermore, the control unit 120C is a controller, and is implemented by, for example, an integrated circuit such as an ASIC or an FPGA.

As illustrated in FIG. 13, the control unit 120C includes a phase distribution generation unit 121, a correction unit 122C, and an adjustment unit 123, and implements or executes actions of the information processing described below. Note that the internal configuration of the control unit 120C is not limited to the configuration illustrated in FIG. 13, and may be another configuration as long as the information processing as described later is performed.

(Correction Unit 122C)

As illustrated in FIG. 13, the correction unit 122C determines a correction coefficient corresponding to the wavelength of the target light intensity distribution (numerical value equalization for each wavelength). Subsequently, once the correction coefficient corresponding to the wavelength is determined, the correction unit 122C extends the phase distribution range by applying the determined correction coefficient (phase range extension processing). Thereafter, the adjustment unit 123 shifts the phase distribution range extended by the correction unit 122C with respect to the phase-modulatable range.

In a case of using the same correction coefficient regardless of the wavelength, each wavelength is converted into an equalized reference number at the time of extension correction in the correction unit 122C. For example, it can be implemented by the phase distribution generation unit 121 increasing or decreasing the phase modulation amount to a phase modulation amount based on a specific wavelength or performing replacement with a signal voltage. Note that, in a case of using the same correction coefficient regardless of the wavelength, it is not necessary to prepare the correction coefficient for each wavelength, and thus, it is possible to reduce the number of adjustment steps at the time of manufacturing.

Figure 16:
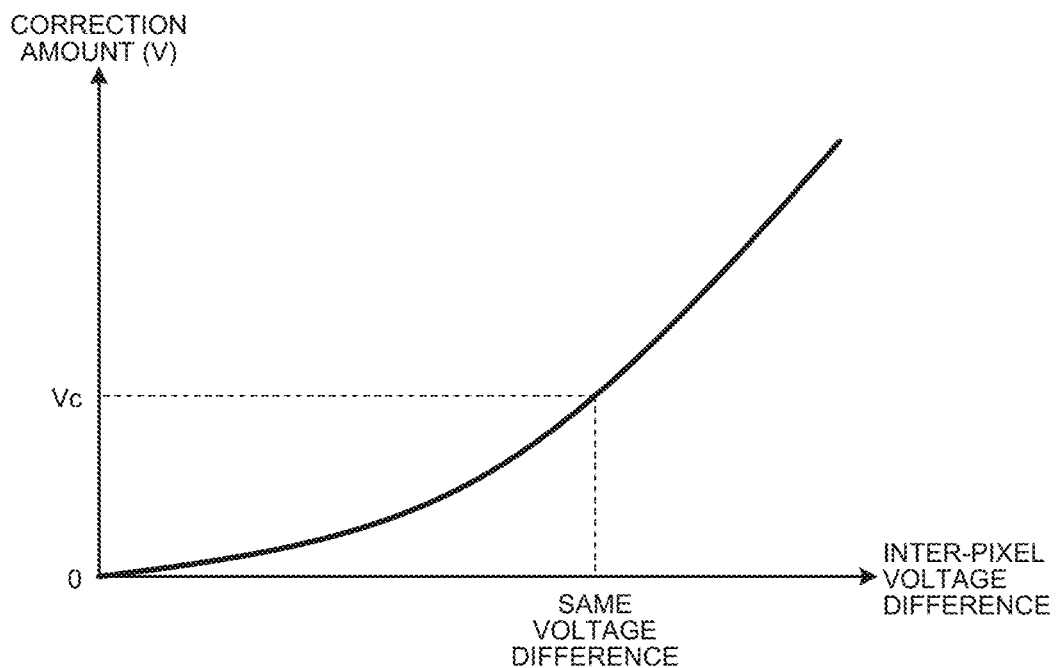
FIG. 16 is a diagram for describing a case of considering the correction amount based on the inter-pixel voltage difference.

Next, a case of considering the correction amount based on the inter-pixel voltage difference will be described with reference to FIG. 16. FIG. 16 is a diagram for describing a case of considering the correction amount based on the inter-pixel voltage difference. As illustrated in FIG. 16, in a case where the inter-pixel voltage difference is the same, the voltage value of the correction amount is also the same value. Therefore, the correction amount can be equalized regardless of the wavelength. For example, the correction unit 122C equalizes the inter-pixel voltage difference regardless of the wavelength.

Figure 17:
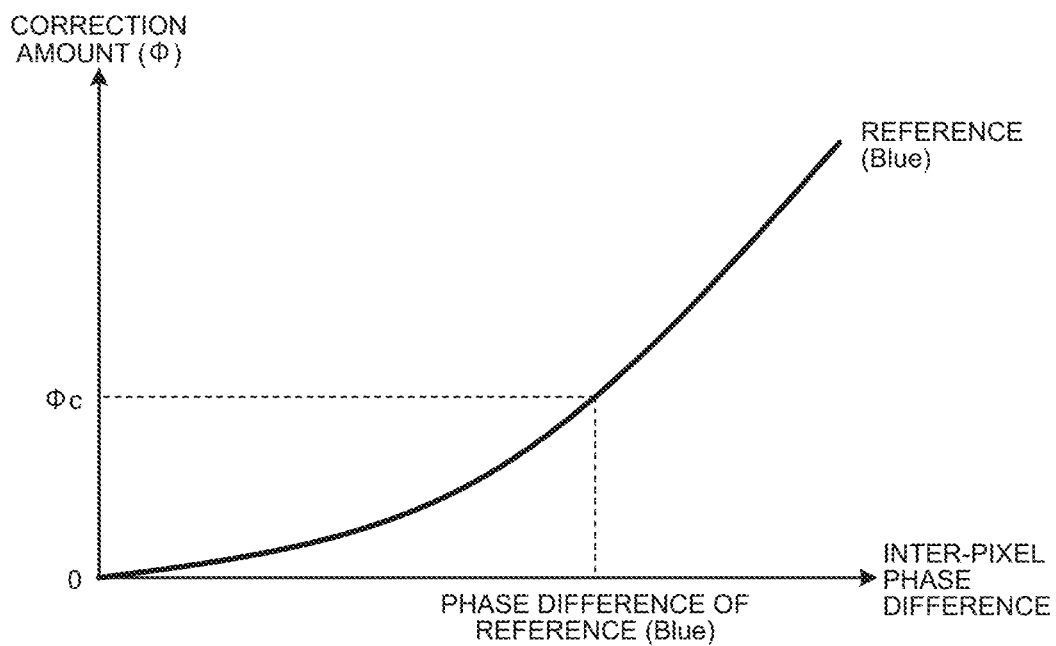
FIG. 17 is a diagram for describing a case of considering the correction amount based on a phase difference of a specific wavelength.

Next, a case of considering the correction amount based on a phase difference of a specific wavelength will be described with reference to FIG. 17. FIG. 17 is a diagram for describing a case of considering the correction amount based on a phase difference of a specific wavelength. As illustrated in FIG. 17, the correction amount can be equalized regardless of the wavelength by replacement with the phase amount of a certain reference wavelength (for example, the wavelength of blue). For example, the correction unit 122C replaces the phase amount of a wavelength other than the reference wavelength with the phase amount of the reference wavelength. Note that the following Formula (4) is established between the wavelength and the phase amount. Here, Φ represents the phase amount, n represents a liquid crystal refractive index (a function of the applied voltage), d represents the thickness of the liquid crystal layer, and λ represents the wavelength.

$$\phi\lambda = 2\pi n d \quad (4)$$

5. Effects According to Present Disclosure

As described above, the information processing device 100 according to the embodiment of the present disclosure or the modified example thereof includes the adjustment unit 123. The adjustment unit 123 shifts the phase distribution range of the light passing through the phase modulation element with respect to the phase-modulatable range of the phase modulation element in such a way that a difference between the median value of the phase-modulatable range and the average value of the phase distribution range becomes small. Specifically, the adjustment unit 123 shifts the phase distribution range with respect to the phase-modulatable range in such a way that the difference between the median value of the phase-modulatable range and the average value of the phase distribution range falls within a predetermined range. For example, the adjustment unit 123 shifts the phase distribution range with respect to the phase-modulatable range in such a way that the median value of the phase-modulatable range coincides with the average value of the phase distribution range.

As a result, for example, in a case where the entire phase distribution range is included in the phase-modulatable range, the information processing device 100 can maintain the amount of phase information included in the phase-modulatable range to the maximum. Furthermore, for example, even in a case where a part of the phase distribution range is not included in the phase-modulatable range, the information processing device 100 can increase the amount of phase information of the phase distribution included in the phase-modulatable range, and thus, can suppress a loss of the phase information of the phase distribution. Therefore, the information processing device 100 can improve the phase modulation accuracy. Furthermore, since the information processing device 100 can improve the phase modulation accuracy, the image quality of the reproduced image can be improved.

Furthermore, the adjustment unit 123 shifts the phase distribution range with respect to the phase-modulatable range in such a way that an overlapping range between the phase-modulatable range and the phase distribution range becomes large.

As a result, for example, even in a case where a part of the phase distribution range is not included in the phase-modulatable range, the information processing device 100 can increase the amount of phase information of the phase distribution included in the phase-modulatable range, and it is thus possible to suppress a loss of the phase information of the phase distribution. Therefore, the information processing device 100 can improve the phase modulation accuracy.

Furthermore, the adjustment unit 123 shifts the phase distribution range with respect to the phase-modulatable range by applying, to the phase modulation element, a voltage in a range in which the magnitude of the change in phase modulation amount with respect to the applied voltage in the phase modulation element exceeds a predetermined threshold. Furthermore, the adjustment unit 123 shifts the phase distribution range with respect to the phase-modulatable range by applying, to the phase modulation element, a voltage in a range in which the linearity of the change in phase modulation amount with respect to the applied voltage in the phase modulation element is secured.

As a result, the information processing device 100 can keep the accuracy of the phase information after the shift adjustment high. Therefore, the information processing device 100 can further improve the phase modulation accuracy.

Furthermore, the information processing device 100 further includes the correction unit 122. The correction unit 122 extends the phase distribution range. The adjustment unit 123 shifts the phase distribution range extended by the correction unit 122.

As a result, the information processing device 100 can suppress the influence of the disclination by the extension correction and can suppress the loss of the phase information due to the extension correction. Furthermore, since the information processing device 100 can suppress the loss of the phase information due to the extension correction, the effect of the extension correction can be improved. Therefore, the information processing device 100 can further improve the phase modulation accuracy.

Further, the correction unit 122 extends the phase distribution range in such a way that the higher the degree of decrease in phase distribution range due to the influence of the disclination, the higher the degree of extension.

As a result, the information processing device 100 can suppress the influence of the disclination in such a way as to cancel the influence of the disclination. Therefore, the accuracy of the phase information can be maintained high. Therefore, the information processing device 100 can further improve the phase modulation accuracy.

Further, before extending the phase distribution range, the correction unit 122 shifts the phase distribution range within one phase cycle in such a way as to decrease the spatial frequency of the phase distribution of light passing through the phase modulation element.

As a result, the information processing device 100 can further suppress the influence of the disclination, and thus, the accuracy of the phase information can be maintained high. Therefore, the information processing device 100 can further improve the phase modulation accuracy.

6. Hardware Configuration

Figure 18:
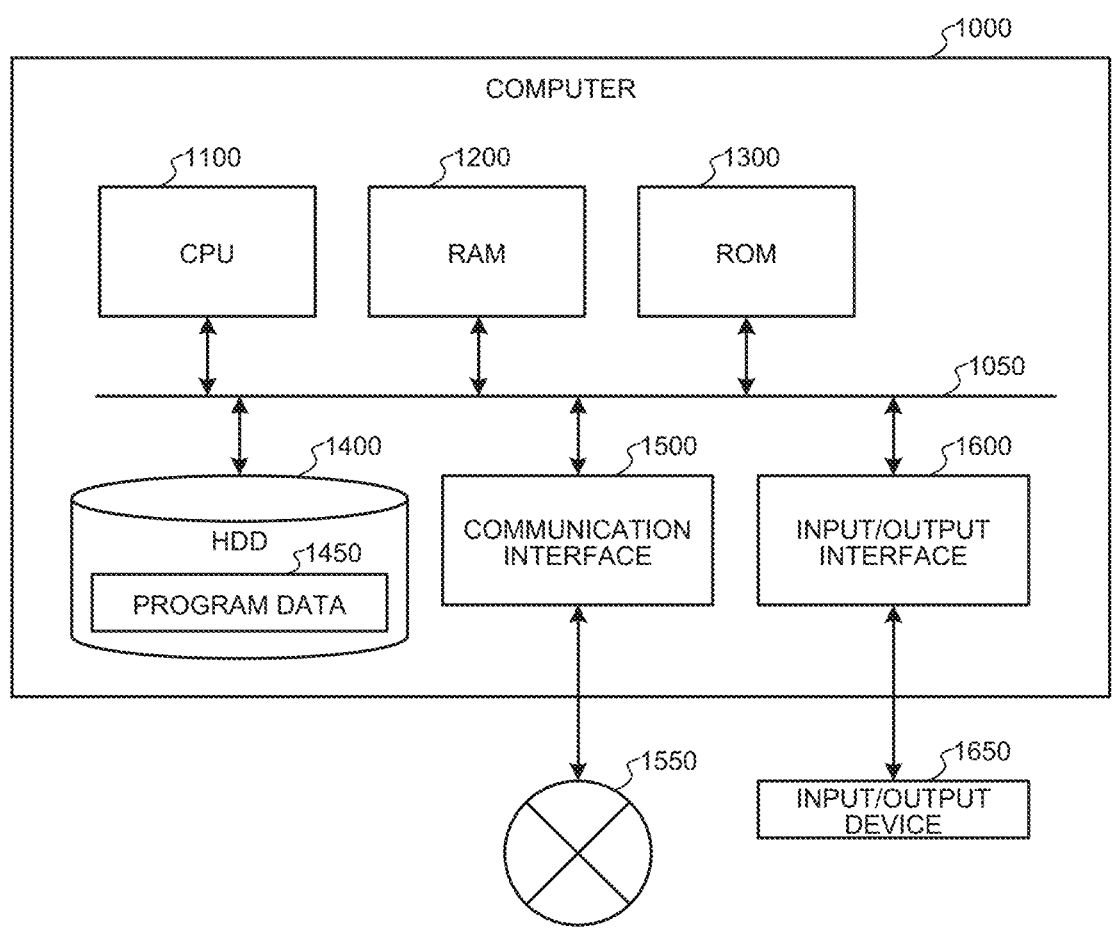
FIG. 18 is a hardware configuration diagram illustrating an example of a computer that implements functions of the information processing device.

An information device such as the information processing device 100 according to the embodiment or modified example described above is implemented by, for example, a computer 1000 having a configuration as illustrated in FIG. 18. FIG. 18 is a hardware configuration diagram illustrating an example of the computer 1000 that implements functions of the information processing device such as the information processing device 100. Hereinafter, the information processing device 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each component of the computer 1000 is connected by a bus 1050.

The CPU 1100 is operated based on a program stored in the ROM 1300 or the HDD 1400, and controls each component. For example, the CPU 1100 loads the program stored in the ROM 1300 or the HDD 1400 on the RAM 1200 and performs processing corresponding to various programs.

The ROM 1300 stores a boot program such as a basic input output system (BIOS) executed by the CPU 1100 when the computer 1000 is started, a program that depends on the hardware of the computer 1000, or the like.

The HDD 1400 is a recording medium that is readable by the computer, in which a program executed by the CPU 1100, data used by the program, or the like, is non-temporarily recorded. Specifically, the HDD 1400 is a recording medium in which the information processing program according to the present disclosure, which is an example of program data 1450, is recorded.

The communication interface 1500 is an interface for the computer 1000 to be connected to an external network 1550 (for example, the Internet). For example, the CPU 1100 receives data from another equipment or transmits data generated by the CPU 1100 to another equipment via the communication interface 1500.

The input/output interface 1600 is an interface for connecting an input/output device 1650 and the computer 1000 to each other. For example, the CPU 1100 receives data from an input device such as a keyboard or mouse via the input/output interface 1600. Further, the CPU 1100 transmits data to an output device such as a display, a speaker, or a printer via the input/output interface 1600. Further, the input/output interface 1600 may function as a medium interface for reading a program or the like recorded in a predetermined recording medium. Examples of the medium include an optical recording medium such as a digital versatile disc (DVD) or a phase change rewritable disk (PD), a magneto-optical recording medium such as a magneto-optical disk (MO), a tape medium, a magnetic recording medium, and a semiconductor memory.

For example, in a case where the computer 1000 functions as the information processing device 100 according to the embodiment, the CPU 1100 of the computer 1000 implements the functions of the control unit 120 and the like by executing the information processing program loaded on the RAM 1200. In addition, the HDD 1400 stores the information processing program according to the present disclosure and data in the storage unit 110. Note that the CPU 1100 reads the program data 1450 from the HDD 1400 and executes the program data 1450, but as another example, these programs may be acquired from another apparatus via the external network 1550.

Note that the present technology can also have the following configurations.

(1)

An information processing device comprising:
an adjustment unit that shifts a phase distribution range of light passing through a phase modulation element with respect to a phase-modulatable range of the phase modulation element in such a way that a difference between a median value of the phase-modulatable range and an average value of the phase distribution range becomes small.

(2)

The information processing device according to (1), wherein the adjustment unit shifts the phase distribution range with respect to the phase-modulatable range in such a way that the difference between the median value of the phase-modulatable range and the average value of the phase distribution range falls within a predetermined range.

(3)

The information processing device according to (1) or (2), wherein the adjustment unit shifts the phase distribution range with respect to the phase-modulatable range in such a way that the median value of the phase-modulatable range coincides with the average value of the phase distribution range.

(4)

The information processing device according to any one of (1) to (3), wherein the adjustment unit shifts the phase distribution range with respect to the phase-modulatable range in such a way that an overlapping range between the phase-modulatable range and the phase distribution range becomes large.

(5)

The information processing device according to any one of (1) to (4), wherein the adjustment unit shifts the phase distribution range with respect to the phase-modulatable range by applying, to the phase modulation element, a voltage in a range in which a magnitude of a change in phase modulation amount with respect to an applied voltage in the phase modulation element exceeds a predetermined threshold.

(6)

The information processing device according to (5), wherein the adjustment unit shifts the phase distribution range with respect to the phase-modulatable range by applying, to the phase modulation element, a voltage in a range in which linearity of the change in phase modulation amount with respect to the applied voltage in the phase modulation element is secured.

(7)

The information processing device according to any one of (1) to (6), further comprising a correction unit that extends the phase distribution range,
wherein the adjustment unit shifts the phase distribution range extended by the correction unit.

(8)

The information processing device according to (7), wherein the correction unit extends the phase distribution range in such a way that the higher the degree of decrease in phase distribution range due to an influence of disclination, the higher the degree of extension.

(9)

The information processing device according to (7) or (8), wherein before extending the phase distribution range, the correction unit shifts the phase distribution range within one phase cycle in such a way as to decrease a spatial frequency of phase distribution of the light passing through the phase modulation element.

(10)

An information processing method comprising:
shifting, by a computer, a phase distribution range of light passing through a phase modulation element with respect to a phase-modulatable range of the phase modulation element in such a way that a difference between a median value of the phase-modulatable range and an average value of the phase distribution range becomes small.

(11)

An information processing program for causing a computer to perform:
adjustment processing of shifting a phase distribution range of light passing through a phase modulation element with respect to a phase-modulatable range of the phase modulation element in such a way that a difference between a median value of the phase-modu-

REFERENCE SIGNS LIST

100 INFORMATION PROCESSING DEVICE
110 STORAGE UNIT
120 CONTROL UNIT
121 PHASE DISTRIBUTION GENERATION UNIT
122 CORRECTION UNIT
123 ADJUSTMENT UNIT
200 DA CONVERTER
300 PHASE MODULATION ELEMENT

The invention claimed is:

1. An information processing device, comprising:
an adjustment unit configured to shift, with respect to a phase-modulatable range of a phase modulation element, a phase distribution range of light that passes through the phase modulation element,
wherein a difference between a median value of the phase-modulatable range and an average value of the phase distribution range decreases based on the shift of the phase distribution range.

2. The information processing device according to claim 1, wherein the difference between the median value of the phase-modulatable range and the average value of the phase distribution range falls within a specific range based on the shift of the phase distribution range.

3. The information processing device according to claim 1, wherein the median value of the phase-modulatable range coincides with the average value of the phase distribution range based on the shift of the phase distribution range.

4. The information processing device according to claim 1, wherein an overlapping range between the phase-modulatable range and the phase distribution range increases based on the shift of the phase distribution range.

5. The information processing device according to claim 1, wherein
the adjustment unit is further configured to shift the phase distribution range with respect to the phase-modulatable range by application of a voltage, to the phase modulation element, and
the voltage is applied in a range in which a magnitude of a change in a phase modulation amount with respect to the applied voltage in the phase modulation element exceeds a specific threshold.

6. The information processing device according to claim 5, wherein the adjustment unit is further configured to apply the voltage in a range in which linearity of the change in the phase modulation amount with respect to the applied voltage in the phase modulation element is secured.

7. The information processing device according to claim 1, further comprising a correction unit configured to extend the phase distribution range,
wherein the adjustment unit is further configured to shift the phase distribution range extended by the correction unit.

8. The information processing device according to claim 7, wherein the correction unit is further configured to extend the phase distribution range in such a way that higher a degree of decrease in the phase distribution range due to an influence of disclination, higher a degree of the extension.

9. The information processing device according to claim 7, wherein the correction unit is further configured to shift, prior to the extension of the phase distribution range, the phase distribution range within one phase cycle in such a way as to decrease a spatial frequency of a phase distribution of the light that passes through the phase modulation element.

10. An information processing method, comprising:
shifting, by a computer, with respect to a phase-modulatable range of a phase modulation element, a phase distribution range of light passing through the phase modulation element,
wherein a difference between a median value of the phase-modulatable range and an average value of the phase distribution range decreases based on the shift of the phase distribution range.

11. A non-transitory computer-readable medium having stored thereon computer-executable instructions which, when executed by a computer, cause the computer to execute operations, the operations comprising:
shifting, with respect to a phase-modulatable range of a phase modulation element, a phase distribution range of light passing through the phase modulation element,
wherein a difference between a median value of the phase-modulatable range and an average value of the phase distribution range decreases based on the shift of the phase distribution range.

* * * * *